United States Patent [19]
Franco et al.

[11] Patent Number: 5,388,017
[45] Date of Patent: Feb. 7, 1995

[54] DISK FILE WITH AIR-BEARING SLIDER HAVING SKIDS

[75] Inventors: Luis P. Franco, Gilroy; Andrew M. Homola, Morgan Hill; Leela Viswanathan, San Jose, all of Calif.

[73] Assignee: International Business Machines Corporation, Armonk, N.Y.

[21] Appl. No.: 285,608

[22] Filed: Aug. 3, 1994

Related U.S. Application Data

[63] Continuation of Ser. No. 11,049, Jan. 29, 1993, abandoned.

[51] Int. Cl.6 ........................ G11B 21/21; G11B 17/32
[52] U.S. Cl. ................................. 360/103; 360/97.02
[58] Field of Search ................. 360/97.02, 103, 104, 360/122, 126

[56] References Cited

U.S. PATENT DOCUMENTS

| | | | |
|---|---|---|---|
| Re. 32,464 | 7/1987 | Aine | 428/622 |
| 4,167,765 | 9/1979 | Watrous | 360/103 |
| 4,327,387 | 4/1982 | Plotto | 360/103 |
| 4,778,582 | 10/1988 | Howard | 204/192.15 |
| 4,866,553 | 9/1989 | Kubo et al. | 360/103 |
| 4,894,740 | 1/1990 | Chhabra et al. | 360/103 |
| 5,010,429 | 4/1991 | Taguchi et al. | 360/103 |
| 5,062,017 | 10/1991 | Strom et al. | 360/103 |
| 5,079,657 | 1/1992 | Aranoff et al. | 360/103 |
| 5,097,368 | 3/1992 | Lemke et al. | 360/97.02 |
| 5,128,821 | 7/1992 | Takeuchi et al. | 360/103 |
| 5,159,508 | 10/1992 | Grill et al. | 360/103 |
| 5,200,867 | 4/1993 | Albrecht et al. | 360/97.02 |
| 5,267,104 | 11/1993 | Albrecht et al. | 360/103 |
| 5,285,337 | 2/1994 | Best et al. | 360/103 |

FOREIGN PATENT DOCUMENTS

| | | | |
|---|---|---|---|
| 63-076163 | 4/1988 | Japan | 360/103 |
| 3-132981 | 6/1991 | Japan | 360/103 |
| 3-241577 | 10/1991 | Japan | 360/103 |
| 4-057260 | 2/1992 | Japan | 360/103 |
| 4-082065 | 3/1992 | Japan | 360/103 |

*Primary Examiner*—John H. Wolff
*Assistant Examiner*—Craig A. Renner
*Attorney, Agent, or Firm*—Thomas R. Berthold

[57] ABSTRACT

A contact start/stop (CSS) disk file has an improved head-disk interface which has significantly reduced static friction between the head-supporting slider and the disk. The slider has a plurality of narrow skids which project from the air-bearing surface of the slider and support the air-bearing surface off the disk when the disk file is not operating. The skids are designed to not affect the flyability of the slider and contain a protective overcoat to minimize wear at the head-disk interface.

8 Claims, 4 Drawing Sheets

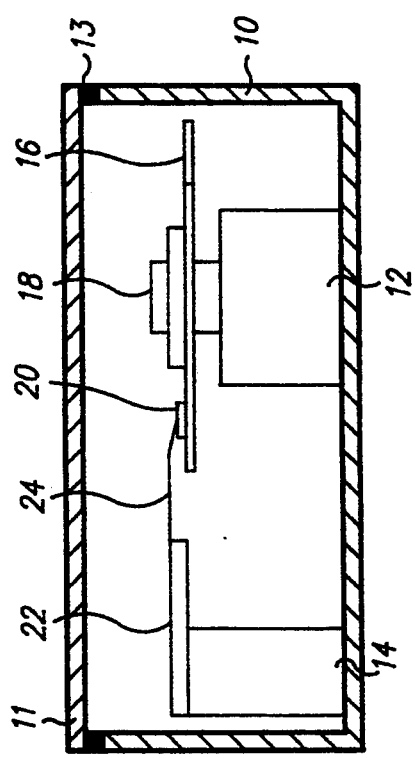
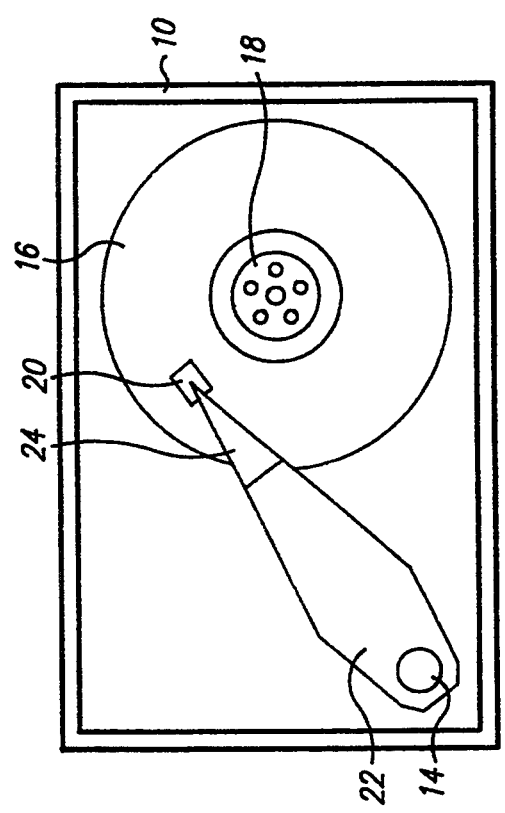
PRIOR ART
FIG. 1
PRIOR ART
FIG. 3

DISK FILE WITH AIR-BEARING SLIDER HAVING SKIDS

This is a continuation of copending application Ser. No. 08/011,049 filed on Jan 29, 1993, now abandoned.

FIELD OF THE INVENTION

This invention relates to a contact start/stop (CSS) data recording disk file having an improved head-disk interface, and to an improved head-supporting slider for use in the disk file.

BACKGROUND OF THE INVENTION

In many types of rotating rigid disk files, each of the read/write transducers (or heads) is supported on a carrier (or slider) which rides on a cushion or bearing of air above the surface of its associated disk when the disk is rotating at its operating speed. The slider has an air-bearing surface (ABS), typically in the form of a plurality of rails, and is connected to a linear or rotary actuator by means of a relatively fragile suspension. There may be a stack of disks in the disk file with the actuator supporting a number of sliders. The actuator moves the sliders radially so that each head may access the recording area of its associated disk surface.

In these conventional disk files the slider is biased towards the disk surface by a small force from the suspension. The ABS of the slider is thus in contact with the disk surface from the time the disk fib is turned on until the disk reaches a speed sufficient to cause the slider to ride on the air-bearing. The ABS of the slider is again in contact with the disk surface when the disk file is turned off and the rotational speed of the disk falls below that necessary to create the air-bearing. In order to provide wear resistance for the ABS, a protective overcoat may be placed on the slider rails. Assignee's U.S. Pat. No. 5,159,508 describes a slider wherein the air-bearing rails have an amorphous carbon overcoat which is adhered to the slider material by a silicon adhesion layer.

The disk for use in such CSS rigid disk files is a thin film metal alloy disk which typically comprises a substrate, such as an aluminum-magnesium (AlMg) alloy with a nickel-phosphorous (NiP) surface coating, and a cobalt-based magnetic alloy film formed by sputter deposition over the substrate. A protective overcoat, such as a sputter-deposited amorphous carbon film, is formed over the magnetic layer to provide corrosion resistance and wear resistance from the ABS of the slider. Assignee's U.S. Pat. No. 4,778,582 describes a protective hydrogenated disk carbon overcoat formed by sputtering a graphite target in the presence of Ar and hydrogen (H2).

In such contact start/stop (CSS) disk files a liquid polyperfluoroether lubricant is also maintained on the surface of the protective disk overcoat to prevent damage to the head and the disk during starting and stopping of the disk. Typically, the lubricant used on disks with carbon overcoats is made up of a first layer of lubricant which is bonded to the carbon and a second layer of free or mobile lubricant on top of the bonded lubricant.

In order to improve the wear resistance of the disk, as well as to maintain consistent magnetic properties, it is desirable to make the disk surface as smooth as possible. However, a very smooth disk surface creates an additional problem in CSS disk files, which is referred to as "stiction". This means that after the slider ABS has been in stationary contact with the disk for a period of time, the slider tends to resist translational movement or "stick" to the disk surface. It is known that this "stiction" force can increase over time. Thus the stiction force measured relatively soon after a CSS cycle is referred to as "CSS stiction", while that measured several hours after a CSS cycle is referred to as "rest stiction". Stiction is caused by a variety of factors, including static friction and adhesion forces between the disk and slider created by the lubricant, typically the mobile lubricant. Stiction in a CSS disk file can result in damage to the head or disk when the slider suddenly breaks free from the disk surface when disk rotation is initiated. In addition, because the suspension between the actuator and the slider is relatively fragile in order to permit the slider to fly above the disk surface, sudden rotation of the disk can also damage the suspension.

What is needed is an improved slider which reduces stiction and thus improves the head-disk interface in a CSS disk file.

SUMMARY OF THE INVENTION

The invention is a CSS disk file wherein the head-disk interface includes a slider with a plurality of narrow skids formed on the ABS rails. The skids extend from the rails to support the rails off the disk when the slider is at rest on the disk, yet do not detract from the flyability of the slider when the disk file is operating. The skids are formed in a manner such that they have a surface area sufficiently small that the CSS stiction and rest stiction are minimal.

For a fuller understanding of the nature and the advantages of the present invention, reference should be made to the following detailed description taken in conjunction with the accompanying drawings.

BRIEF DESCRIPTION OF THE DRAWINGS

FIG. 1 is a schematic side view of a conventional disk file;

FIG. 3 is a top view of the conventional disk file of FIG. 1 with the cover removed;

DESCRIPTION OF THE PREFERRED EMBODIMENTS

Prior Art

Figure 2:
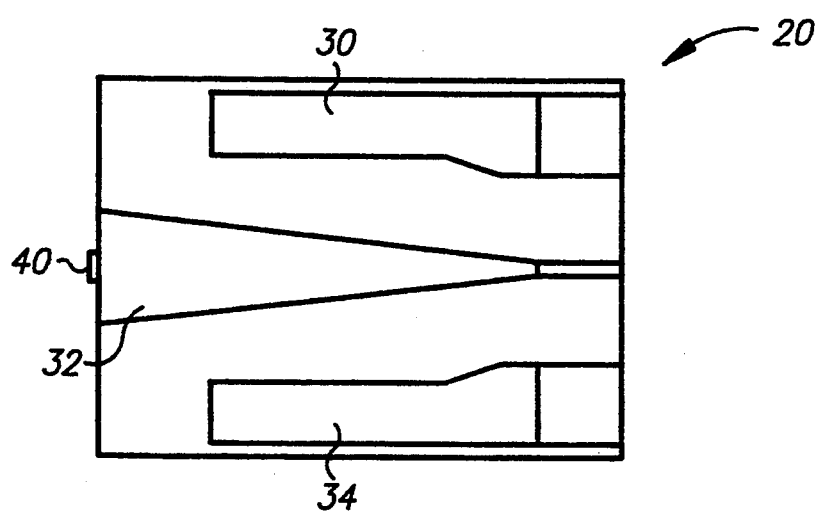
FIG. 2 is a plan view of the ABS of a conventional slider.

Referring first to FIG. 1, there is illustrated in sectional view a schematic of a conventional disk file. The disk file comprises a base 10 to which are secured a disk drive motor 12 and an actuator 14, and a cover 11. The base 10 and cover 11 provide a substantially sealed housing for the disk drive. Typically there is a gasket 13 located between base 10 and cover 11 and a small breather port (not shown) for equalizing pressure between the interior of the disk file and the outside environment. This type of disk file is described as being substantially sealed since the drive motor 12 is located entirely within the housing and there is no external forced air supply for cooling the interior components. A magnetic recording disk 16 is mounted on a hub 18, which is attached for rotation by drive motor 12. The disk 16 may be a conventional disk comprising an AlMg substrate with a NiP surface coating, a Cr underlayer over the NiP coating, a Co alloy magnetic layer over the Cr underlayer, an amorphous carbon or hydrogenated carbon (H:C) overcoat on the magnetic layer, and a lubricant film on the carbon overcoat. Typically the lubricant film is a two-layer liquid perfluoroether wherein the first layer is chemically bonded to the carbon overcoat by heating, ultraviolet light or inert gas plasma, and the second or top layer is lubricant which is free or mobile on the bonded layer.

A read/write head or transducer 40 (FIG. 2) is formed on the trailing end of a slider 20 having an air-bearing surface (ABS). The slider 20 is connected to the actuator 14 by means of a rigid arm 22 and a suspension 24, the suspension 24 providing a biasing force which urges the slider 20 toward the surface of the recording disk 16. During operation of the disk file the drive motor 12 rotates the disk 16 at a constant speed, and the actuator 14, which is typically a linear or rotary voice coil motor (VCM), moves the slider 20 generally radially across the surface of the disk 16 so that the read/write head may access different data tracks on disk 16. The ABS of slider 20 is in contact with the lubricant film on disk 16 during start and stop operations and is maintained above the surface of the disk 16 by an air bearing when the disk file is operating.

Referring to FIG. 2, a view of the slider 20 as seen from the disk is shown and illustrates the rails 30, 32, 34 which form the air-bearing surface. The slider 20 illustrated in FIG. 2 is the three-rail slider described in detail in assignee's U.S. Pat. No. 4,894,740. A protective carbon overcoat may be formed on the surface of the rails 30, 32, 34.

FIG. 3 illustrates a top view of the interior of the disk file with the cover 11 removed. FIG. 3 also illustrates in better detail the suspension 24 which may be a conventional type of suspension such as the well-known Watrous suspension, described in assignee's U.S. Pat. No. 4,167,765.

PREFERRED EMBODIMENTS

Figure 4A:
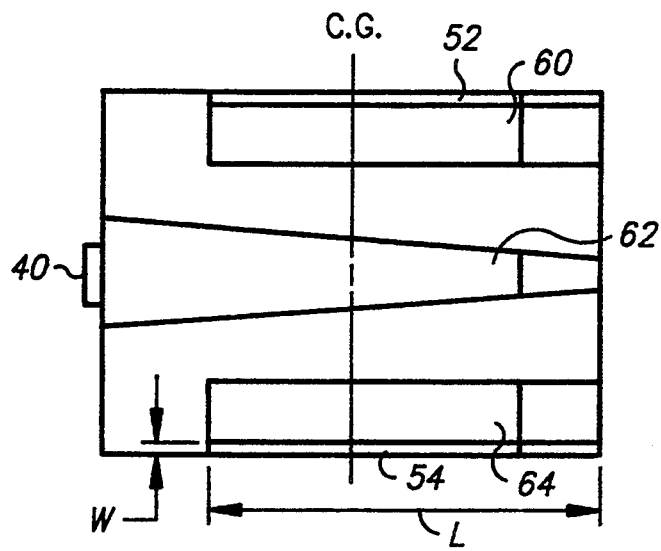
FIG. 4A is a plan view of the bottom or disk side of the slider of the present invention.

Referring now to FIG. 4A, the bottom or disk side of the slider of the present invention is illustrated. The slider is similar to slider 20 (FIG. 2), but has skids 52, 54 on the outside rails 60, 64, respectively. The skids 52, 54 are preferably formed of amorphous hydrogenated carbon (H:C).

Figure 4B:
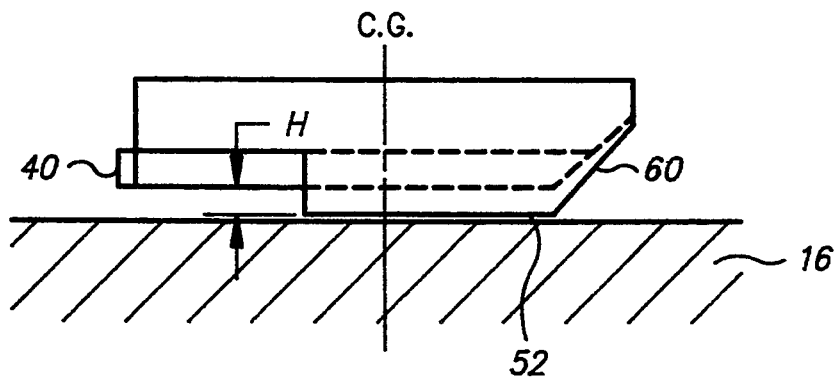
FIG. 4B is a side view illustrating the slider of FIG. 4A at rest on the disk surface.
Figure 4C:
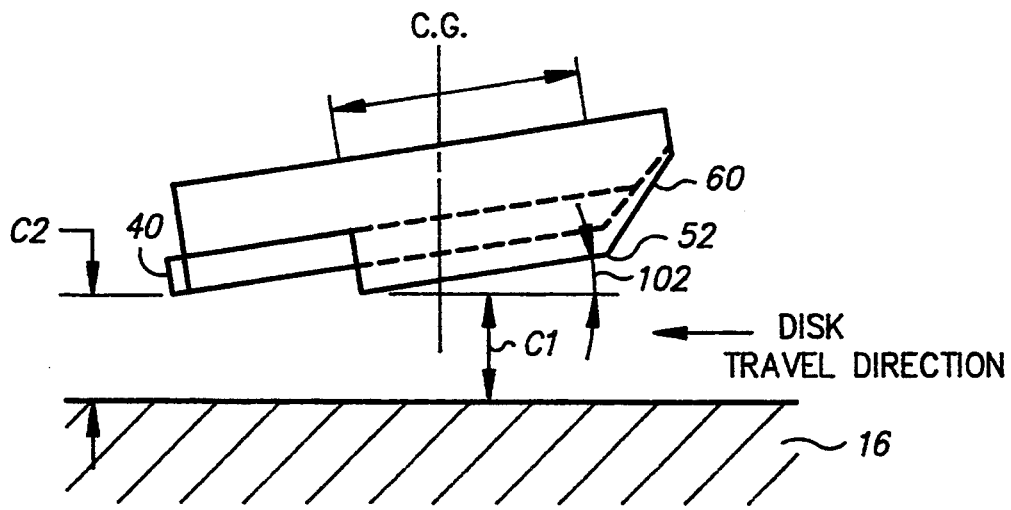
FIG. 4C is a side view illustrating the slider of FIG. 4A when flying above the disk.

The length L, width W, and height H (FIG. 4B) of the skids 52, 54 are determined by a number of factors, which will be explained with respect to FIG. 4C, which illustrates the flying position of the slider. The pitch angle 102 and clearance C1 of the slider constrain the height H of the skids 52, 54. This height should be sufficient to reduce stiction, but provide enough clearance C1 and C2 so that the slider does not touch the surface of disk 16 during operation. The minimum length L of the skid is the length required to maintain the slider parallel with the disk at rest (see FIG. 4B). Typically this length starts at the front of the slider and extends just past the center of gravity (C.G.) of the slider when under suspension load. The maximum length of L is that which does not interfere with the clearance C2 of the head 40. The length L of the skids 52, 54 could be less than the length of the rails 60, 64 provided they support the slider in the manner shown in FIG. 4B. The width W of the skids 52, 54 should be as narrow as possible to maintain low stiction and adequate durability. FIG. 4C shows that even though skids 52, 54 extend from the rails 60, 64, they do not increase the spacing between head 40 and disk 16. This is because the rails 60, 64 provide the air-bearing and have a length less than the overall length of the slider so as to generate the pitch-up attitude 102 shown. Thus, the skids 52, 54 can be designed such that they are farther away from disk 16 than head 40 when the slider is flying.

For a slider with a desired clearance C2 of 150 nm, a pitch angle 102 of 135 micro-radians and a foot print as shown in FIG. 4A, the preferred embodiment uses skids 52, 54 which are 100 nm high, 10 μm wide, and 1.9 mm long.

The preferred method of manufacturing the slider will now be described with reference to FIGS. 5A–5D, which represent sectional views of the slider taken across rails 60, 62, 64 along the center of gravity plane shown in FIGS. 4A–4C. The slider body 78 is typically formed of a conventional ceramic mixture of titanium carbide (TiC) and alumina ($Al_2O_3$). The ABS 74 of each of the rails 60, 62, 64 may be overcoated with a protective film, such as H:C.

Figure 5A:
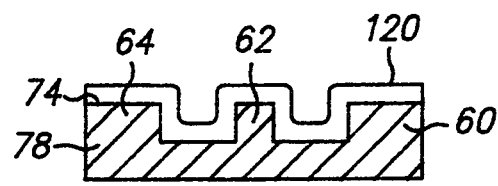
FIGS. 5A–5D are sectional views of the slider of the present invention illustrating sequential steps in its fabrication.
Figure 5B:
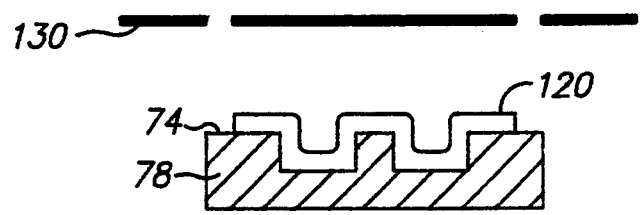
Figure 5C:
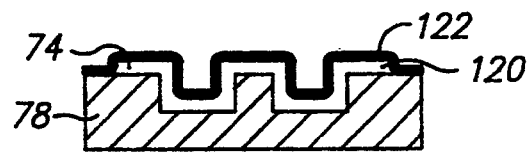
Figure 5D:
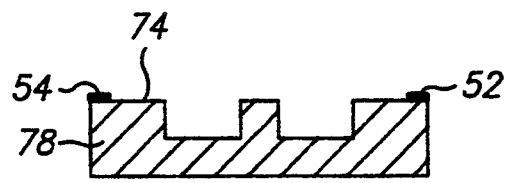

In FIG. 5A a layer of photoresist 120, in this case a positive resist, is rolled on top of the slider ABS 74 to a thickness of approximately 0.08 millimeters. The photoresist 120 is then exposed through a suitable mask 130 which defines the skids 52, 54. After the development and removal of the exposed photoresist in the regions of skids 52, 54 (FIG. 5B), the ABS 74 of the slider is coated with a sputter deposited multilayer overcoat 122 (FIG. 5C). The overcoat 122 comprises a first 25–50 Angstrom layer of silicon (Si) sputter deposited onto ABS 74, followed by 100 nm of H:C. The combined film of Si and H:C determines the thickness of the skids 52, 54. The remaining photoresist 120 is also coated with the Si/H:C layer 122. After deposition of the overcoat 122, the remaining photoresist layer 120 and overcoat 122 outside the regions of skids 52, 54 are removed by suitable solvent such as acetone, resulting in the completed slider shown in FIG. 5D.

The tests performed on the head disk interface using the slider of the present invention included rest stiction and CSS stiction. The CSS and rest stiction measurements are the force in grams required for the slider to break free from the disk after it has been in contact with the disk for a period of time. The results of these tests are listed in the following Tables A and B.

TABLE A

| | REST STICTION FORCE (gms) | | | |
| | After 2,500 CSS Cycles | | After 10,000 CSS Cycles | |
| Rest Time | Slider A | Slider B | Slider A | Slider B |
| --- | --- | --- | --- | --- |
| 5 sec | 4 | 6 | 5 | 10 |
| 2 hr | 5 | 25 | 5 | 30 |
| 10 hrs | 9 | 25 | 5 | 30 |
| 20 hrs | 10 | 25 | 12 | 35 |
| 80 hrs | 10 | 26 | | |
| 120 hrs | 10 | — | | |

TABLE B

| | CSS STICTION FORCE (gms) | | | |
|---|---|---|---|---|
| | Rest Time | | | |
| | Slider A | | Slider B | |
| CSS Cycles | 5 sec* | 2 hr | 5 sec* | 2 hr |
| 0 | 5 ± 1 | — | 4 ± 1 | — |
| 2500 | 5 ± 1 | 5 | 6 ± 2 | 25 |
| 5000 | 5 ± 1 | 5 | 7 ± 2 | 23 |
| 7500 | 5 ± 1 | 5 | 8 ± 2 | 25 |
| 10000 | 5 ± 1 | 5 | 10 ± 2 | 30 |

*Average of 250 pts.

The data in Table A shows rest stiction force in grams measured after 2,500 and 10,000 CSS cycles at various rest times of up to 120 hours. Slider A is a typical slider of the present invention while slider B is a slider of conventional design. Table B shows CSS stiction data for sliders A and B. In Table B the rest time was five seconds measured every CSS cycle and two hours measured every 2,500 CSS cycles. The disks used for the experiments were typical sputtered thin film disks comprised of an AlMg/NiP substrate, Cr underlayer, CoPtCr magnetic layer, and a H:C overcoat. The lubricant was a polyperfluoroether where 12–14 Å was bonded to the carbon overcoat and 8–10 Å was mobile.

From Table A and Table B it is evident that slider A has lower rest stiction than slider B. The five second rest and long time rest stiction measurements show little or no increase with increased CSS cycling for slider A. In contrast, slider B increases in both 5 second rest and long time rest stiction measurements with increased CSS cycles. The skids on slider A showed no evidence of wear. The disks also showed no wear for slider A or B. By reducing the contact surface area of slider A using the skids as described in the present invention, the rest stiction was reduced by a factor of approximately three compared to conventional sliders, while maintaining acceptable slider and disk durability.

While the preferred embodiments of the present invention have been illustrated in detail, it should be apparent that modifications and adaptations to those embodiments may occur to one skilled in the art without departing from the scope of the present invention as set forth in the claims.

What is claimed is:

1. A transducer assembly for use in a contact start/stop data recording disk file having a rotatable disk for the storage of data, the assembly comprising:
   an air-beating slider having a front end and a rear end and comprising a pair of spaced-apart rails, each of the rails having an air-bearing surface and extending from the front end of the slider to a point between the rear end of the slider and the midpoint of the slider, and a rectangularly-shaped skid formed as a carbon overcoat strip projecting from the air-bearing surface of each of the rails, each skid having its length oriented generally parallel to its rail and extending generally the length of its rail; and
   a transducer formed on the rear end of the slider for writing data to or reading data from the disk.

2. The assembly according to claim 1 wherein the skids are located on the outside regions of the rails.

3. The assembly according to claim 1 wherein the disk has a film of liquid lubricant on its surface and wherein the height of the skids is greater than the lubricant film thickness.

4. The assembly according to claim 1 wherein the carbon overcoat strip comprises an essentially amorphous hydrogenated carbon overcoat.

5. A contact start/stop data recording disk file comprising:
   rigid data disk;
   a motor connected to the disk for rotating the disk;
   an air-bearing slider having a front end and a rear end and comprising a pair of spaced-apart rails, each of the rails having an air-bearing surface and extending from the front end of the slider to a point between the rear end of the slider and the midpoint of the slider, and a rectangularly-shaped skid formed as a carbon overcoat strip projecting from the air-bearing surface of each of the rails, each skid having its length oriented generally parallel to its rail and extending generally the length of its rail;
   a transducer formed on the rear end of the slider for writing data to or reading data from the disk; and
   an actuator connected to the slider for moving the slider generally radially across the disk so the transducer may access different regions of data on the disk, whereby the air-bearing surfaces of the rails and the transducer are supported above the disk by the skids when the disk is not rotating and the portion of the slider between the rear end and the rails is positioned near the disk without interference by the skids when the disk is rotating at its operating speed.

6. The disk file according to claim 5 wherein the skids are located on the outside regions of the rails.

7. The disk file according to claim 5 wherein the disk has a film of liquid lubricant on its surface and wherein the height of each of the skids is greater than the lubricant film thickness.

8. The disk file according to claim 5 wherein the carbon overcoat strip comprises an essentially amorphous hydrogenated carbon overcoat.

* * * * *

UNITED STATES PATENT AND TRADEMARK OFFICE
CERTIFICATE OF CORRECTION

PATENT NO.    :   5,388,017
DATED         :   February 7, 1995
INVENTOR(S)   :   Luis P. Franco et al.

It is certified that error appears in the above-identified patent and that said Letters Patent is hereby corrected as shown below:

Claim 1, col. 5, line 49, "air-beating" should read "air-bearing".

Signed and Sealed this

Third Day of October, 1995

Attest:

BRUCE LEHMAN

Attesting Officer    Commissioner of Patents and Trademarks